United States Patent Office 3,100,217
Patented Aug. 6, 1963

3,100,217
NEW VINYL COMPOUNDS AND METHODS
FOR THEIR PREPARATION
Bodo K. W. Bartocha, 4567 Main St., Riverside, Calif.
No Drawing. Filed Mar. 31, 1959, Ser. No. 803,333
2 Claims. (Cl. 260—448)
(Granted under Title 35, U.S. Code (1952), sec. 266)

The invention herein described may be manufactured and used by or for the Government of the United States of America for governmental purposes without the payment of any royalties thereon or therefor.

This invention relates to new vinylated compounds of the type formula $(CH_2=CH)_x R^1 R_y^2$ wherein $R^1$ is an element selected from the class consisting of B, Al, Ga and Ge, $R^2$ is halogen, alkoxy or aroxy, and $x$ and $y$ are whole numbers from 1 to 2 such that their sum is 3. The compounds include mono- and di-vinylated compounds containing an element from the class consisting of B, Al, Ga and Ge, and a halogen atom or other functional group, such as, alkoxy or aroxy. Typical mono-vinylated and di-vinylated compounds are vinylaluminum dichloride and divinylaluminum chloride, respectively. The mono-vinylated compounds are made by reacting divinylmercury, divinylzinc, tetravinyllead or tetravinyltin with halogen, alkoxy or aroxy derivatives of elements from the above class.

Prior to this invention it has not been possible to make the monovinylated and/or di-vinylated compounds by a one-step method which could be controlled. The use of the di-vinyl and tetravinyl starting materials mentioned above makes it possible to produce both type compounds by a controllable process which is economical and produces excellent yields of from 75% to 95%. The di-vinylated compounds of the invention can only be produced by using the tetravinyl starting materials, however, the monovinylated compounds can also be produced from the tetravinyl starting materials.

The invention is illustrated by the following examples which are exemplary only of the invention but in no way limiting thereof. In the examples the vinyl radical is represented by the symbol Vi. Stoichiometric amounts were used in all examples. Examples 1–9, inclusive, illustrate the preparation of the monovinyl derivatives.

Example I

ViBF$_2$ was prepared according to the reaction equation

$$Vi_2Hg + BF_3 \rightarrow ViBF_2 + ViHgCl$$

by condensing BF$_3$ onto Vi$_2$Hg in a high vacuum system at $-196°$ C. The mixture was allowed to warm up to room temperature where reaction takes place instantly. The ViBF$_2$, a gas (V.P. 75 mm. at $-780$ C.), may then be removed by standard techniques.

Example II

ViBCl$_2$ was prepared according to the reaction equation

$$Vi_4Sn + BCl_3 \rightarrow ViBCl_2 + Vi_3SnCl$$

by mixing ViSn and BCl in "Nujol" at 0° C. The mixture was then allowed to warm up to room temperature and stirred for eight hours. Upon purification of the reaction product a pure fraction of ViBCl$_2$ was obtained boiling at 45.5° C./760 mm. Hg. ("Nujol" is a white mineral oil having a boiling range 180–280° C.)

Example III

ViAlCl$_2$ was prepared according to the reaction equation

$$Vi_2Zn + AlCl_3 \rightarrow ViAlCl_2 + ViZnCl$$

in reacting Vi$_2$Zn and AlCl$_3$ in "Nujol" by stirring the reactants at 0° C. eight hours. The liquid fraction, ViAlCl$_2$, was then removed by vacuum distillation. It had a boiling point of 55–58° C./4 mm. Hg.

Example IV

ViGaCl$_2$ was prepared according to the reaction equation

$$Vi_2Zn + GaCl_3 \rightarrow ViGaCl_2 + ViZnCl$$

by stirring Vi$_2$Zn with an excess (10%) of GaCl for five hours at 0° C. During purification the isolated ViGaCl$_2$ polymerized. Analysis of the polymer confirmed the formula of the compound.

Example V

ViSiCl$_3$ was prepared according to the reaction equation

$$Vi_2Hg + SiCl_4 \rightarrow ViSiCl_3 + ViHgCl$$

by heating a mixture of Vi$_2$Hg and SiCl$_4$ to 60° C. for six hours. The volatile material was removed in vacuo and then fractionated by distillation. The formed ViSiCl$_3$ had a boiling point of 92° C./760 mm. Hg.

Example VI

ViGeCl$_3$ was prepared according to the reaction equation

$$Vi_2Hg + GeCl_4 \rightarrow ViGeCl_3 + ViHgCl$$

by refluxing Vi$_2$Hg and GeCl$_4$ at 80–85° for five hours. The volatile material was removed in vacuo and then fractionated by distillation. The ViGeCl$_3$ had a boiling point of 128.5° C./760 mm. Hg.

Example VII

ViSnCl$_3$ was prepared according to the reaction equation

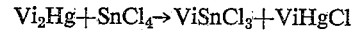
$$Vi_2Hg + SnCl_4 \rightarrow ViSnCl_3 + ViHgCl$$

by heating Vi$_2$Hg and SnCl$_4$ to 75° C. for five hours. The volatile material was removed in vacuo and then fractionated by distillation. The ViSnCl$_3$ had a boiling point of 48–50° C./5 mm. Hg.

Example VIII

ViPCl$_2$ was prepared according to the reaction equation

$$Vi_2Zn + PCl_3 \rightarrow ViPCl_2 + ViZnCl$$

by heating Vi$_2$Zn and PCl$_3$ to 60° C. for six hours. The volatile material was removed in vacuo and then fractionated by distillation. The formed ViPCl$_2$ had a boiling point of 104° C./760 mm. Hg.

Example IX

ViAsCl$_2$ was prepared according to the reaction equation

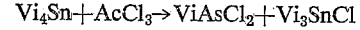
$$Vi_4Sn + AcCl_3 \rightarrow ViAsCl_2 + Vi_3SnCl$$

by heating Vi$_4$Sn and AsCl$_3$ to 80° C. for six hours. By fractionated distillation a portion of material was obtained boiling at 60–61° C./40 mm. Hg. Analysis confirmed the compound as ViAsCl$_2$.

The following examples illustrate the preparation of the divinyl derivatives.

Example X

Vi$_2$AlCl was prepared according to the reaction equation

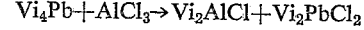
$$Vi_4Pb + AlCl_3 \rightarrow Vi_2AlCl + Vi_2PbCl_2$$

as follows. Vi$_4$Pb and AlCl$_3$ were allowed to react in an inert solvent at a temperature of about 0° C. while stirring for eight hours. The volatile material, Vi$_2$AlCl, was then removed and purified further by high vacuum techniques. The formed Vi$_2$AlCl had a boiling point of 60–65° C./4 mm. Hg.

Example XI

Vi$_2$SiCl$_2$ was prepared according to the reaction equation

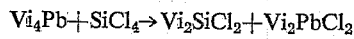

by heating Vi$_4$Pb and SiCl$_4$ under nitrogen at 85° C. for about eight hours, removing the volatile part in vacuo and then fractionating it by distillation. The formed Vi$_2$SiCl$_2$ had a boiling point of 119° C./760 mm. Hg.

Example XII

Vi$_2$PCl was prepared according to the reaction equation

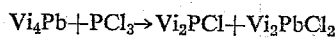

by heating Vi$_4$Pb and PCl$_3$ under nitrogen at 86° C. for about eight hours, removing the volatile part in vacuo and then fractionating it by distillation. The formed Vi$_2$PCl had a boiling point of 111–112° C./760 mm. Hg.

Example XIII

Vi$_2$AsBr was prepared according to the reaction equation

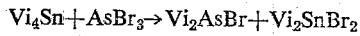

by heating Vi$_4$Sn and AsBr$_3$ to 75° C. for six hours. Upon purification of the reaction product Vi$_2$AsBr, boiling at 73–75° C./14 mm. Hg, was obtained.

All of the above compounds of the invention were identified by standard analysis procedures including infrared and elemental analysis.

The compounds of the invention have utility as polymerization agents and as intermediates for the formation of high temperature polymers. Their co-hydrolysis products with organosilicon or organotitanium compounds are high temperature polymers. For example, the co-hydrolysis product of vinyl aluminum dichloride with diphenyl silicon dichloride may by conventional hydrolysis procedures is a useful high temperature dielectric. The compounds are also useful as polymerization catalysts and accelerators. For example, they are useful as catalysts in the manufacture of polyethylene and polypropylene. They can be substituted for conventional reaction accelerators in the production of organovinyl polymers, such as, polyvinyl chloride or polyvinyl tetrafluoride.

As the compounds of Vi$_2$Hg, Vi$_2$Zn, Vi$_4$Sn and Vi$_4$Pb are new compounds, a method for the preparation of each is given below.

Divinylzinc was prepared as follows: A slurry of zinc chloride (0.425 mole in 300 ml. tetrahydrofuran) was added slowly to vinylmagnesium bromide (1 mole in 450 ml. tetrahydrofuran) cooled to 0° C. The mixture was then maintained at 55° for twelve hours, after which time it was cooled to 10° C. and 250 ml. of de-gassed diethyl ether was added. The supernatant liquid was then filtered under prepurified nitrogen through glass wool into a receiver. Experience showed that while divinylzinc is fairly stable in dilute solution it becomes much less stable in concentrated solutions, particularly in the presence of salts. Therefore, after the vinylation step all subsequent manipulations should be done as rapidly as possible. Solvent was removed by pumping at room temperature until the volume of liquid was reduced to about 100 ml. The residue was then vacuum-transferred into a 150 ml. distillation flask cooled to −78° C., at which temperature it was crystalline, and then distilled, first at 200 mm. pressure to remove the last traces of tetrahydrofuran, and subsequently at 32°/22 mm. The divinylzinc obtained (6 g. yield 10% based on the zinc chloride taken for reaction) was tensimetrically homogeneous. In other preparations of divinylzinc the yields varied but were rarely greater than 25%.

Divinylmercury was prepared by treating an excess of vinylmagnesium bromide with mercury (II) chloride in tetrahydrofuran. Two moles of vinylmagnesium bromide were prepared under a prepurified nitrogen atmosphere in 600 ml. of tetrahydrofuran, which had previously been distilled from lithium aluminum hydride to remove water and peroxides. After formation of the Grignard was completed, mercury (II) chloride (0.77 mole in 250 ml. tetrahydrofuran) was added slowly with vigorous stirring, the reaction flask being cooled with ice water. When the mercury (II) chloride had been added, the reaction mixture was maintained with stirring at a temperature of about 55° C. for 12 hours. The flask was then cooled to room temperature, and the excess of Grignard was hydrolyzed with approximately 250 ml. of a saturated ammonium chloride solution. The organic layer was decanted into a distillation flask, and the residual salts washed with several portions of diethyl ether, the washings being added to the flask. Most of the solvent was then distilled off at normal pressure. Paraffin oil was added as a carrier, and distillation was continued under reduced pressure. In ths way, at 59.5° C. and 20 mm., 167 g. (yield 85.10%) of the new compound divinyl-mercury were obtained. (Found: C, 19.1; H, 2.8; Hg, 78.0. C$_4$H$_6$Hg required: C, 18.7; H, 2.4; Hg, 78.9%.)

Tetravinyllead is made as follows: Sixty-six g. (0.5 mole) of vinylmagnesium bromide was prepared under a nitrogen atmosphere in 500 ml. tetrahydrofuran, freshly distilled from lithium aluminum hydride. After formation of the Grignard was accomplished, 49.8 g. (0.1 mole) of potassium hexachloroplumbate was slowly added while stirring, the reaction flask being cooled with ice water. The K$_2$PbCl$_6$ was prepared by chlorinating an ice-cold solution of PbCl$_2$ (0.2 mole) in concentrated hydrochloric acid (300 ml.). After all the PbCl$_2$ had reacted, a saturated solution of KCl was added to precipitate the K$_2$PbCl$_6$. It was washed wth ice-cold ethanol. Yield 85%. When all of the K$_2$PbCl$_6$ had been added, the reaction mixture was maintained with stirring at a temperature of 55° C. for eight hours. The flask was then cooled to room temperature and the excess of Grignard was hydrolyzed with approximately 80 ml. of saturated aqueous solution of ammonium chloride. The brown organic layer was decanted into a distillation flask and the residual salts washed with severl portions of fresh tetrahydrofuran, the washings being added to the main portion. Most of the solvent was then removed at normal pressure. Paraffin oil was added as a carrier and distillation was continued under reduced pressure. In this way, at 52–54° C. and 4 mm. Hg, 21.9 g. (69.5%) of the new compound tetravinyllead were obtained.

Tetravinyltin was made as follows: 266.3 g. (2.5 moles of vinylmagnesium bromide were prepared in 1000 cc. of freshly distilled tetrahydrofuran. The reaction was carried out in a 2-liter, 3-necked flask, fitted with a reflux condenser, mechanical stirrer and a dropping funnel. After formation of the Grignard was completed 130.3 g. (0.5 mole) of tintetrachloride was added dropwise and the mixture then refluxed for eight hours. On cooling the reaction mixture was hydrolyzed with approximately 285 cc. of an aqueous solution of saturated ammonium chloride. The organic layer was separated, the solvent removed and the residue carefully fractionally distilled under reduced pressure at 55–57° C./17 mm. Hg, to yield 98 g. of tetravinyltin.

Other reactants than the halogen compounds of elements of groups III, IV and V of the periodic table may be used. Other equivalents for these functional groups which may be used are the alkoxy and aroxy groups. Alkoxy groups which may be used are —OCH$_3$; —OC$_2$H$_5$; —OC$_3$H$_7$. Aroxy compounds which are suitable reactants are

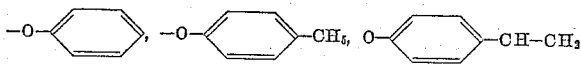

The invention has been illustrated using compounds in which the unsaturated organic radical is the vinyl group, however, analogous compounds in which the vinyl group is replaced by other unsaturated radicals, such as, propylene, butylene and higher unsaturated radicals, may be used in the process to produce analogous products.

Obviously many modifications and variations of the present invention are possible in the light of the above teachings. It is therefore to be understood that within the scope of the appended claims the invention may be practiced otherwise than as specifically described.

What is claimed is:

1. The process for preparing vinylaluminum dichloride which comprises reacting one molar equivalent of divinylzinc with one molar equivalent of aluminum trichloride at 0° C. for eight hours.

2. The process for preparing divinylaluminum chloride which comprises reacting one molar equivalent of tetravinyllead with one molar equivalent of aluminum trichloride at 0° C. for eight hours.

References Cited in the file of this patent

UNITED STATES PATENTS

| 2,921,954 | Ramsden | Jan. 19, 1960 |
| 2,967,875 | Wilke | Jan. 10, 1961 |
| 3,010,985 | Ramsden | Nov. 28, 1961 |

OTHER REFERENCES

Chemical Society Proceedings, April 1958, page 116 (QD–1–C6p).

J. Amer. Chem. Soc. 79 (1957), pages 515, and 5884–5889.

Solerio: Gazz. Chem. Ital. 85 (1955), page 64.

Zeitschrift für Naturforschung, vol. 12B, pp. 263–4 (1957), shows trivinylphosphine, etc. and fully meets claim.

European Scientific Notes, July 1, 1952 (vol. 6. No. 13), page 178. Published by Office of Naval Research, London.